(12) United States Patent
Hegner

(10) Patent No.: US 9,249,918 B2
(45) Date of Patent: Feb. 2, 2016

(54) DEVICES AND METHODS FOR THE CHECKING AND FOR THE CHECKING AND REPAIRING OF PIPE CONNECTIONS

(75) Inventor: Rolf Hegner, Galgenen (CH)

(73) Assignee: HeSan GmbH, Tuggen (CH)

( * ) Notice: Subject to any disclaimer, the term of this patent is extended or adjusted under 35 U.S.C. 154(b) by 431 days.

(21) Appl. No.: 13/560,831

(22) Filed: Jul. 27, 2012

(65) Prior Publication Data
US 2013/0319540 A1    Dec. 5, 2013

(30) Foreign Application Priority Data

May 29, 2012 (EP) .................................... 12405050

(51) Int. Cl.
| | |
|---|---|
| *F16L 55/18* | (2006.01) |
| *G01M 3/08* | (2006.01) |
| *F16L 55/1645* | (2006.01) |
| *E21B 33/124* | (2006.01) |
| *G01M 3/00* | (2006.01) |
| *F16L 101/30* | (2006.01) |

(52) U.S. Cl.
CPC ....... *F16L 55/16455* (2013.01); *E21B 33/1243* (2013.01); *G01M 3/005* (2013.01); *F16L 2101/30* (2013.01); *Y10T 137/0441* (2015.04)

(58) Field of Classification Search
CPC ........... F16L 55/16455; F16L 2001/30; E21B 33/1243; G01M 3/005
USPC ........................ 138/93, 97; 137/15.11; 285/15
See application file for complete search history.

(56) References Cited

U.S. PATENT DOCUMENTS

| | | | | |
|---|---|---|---|---|
| 1,221,733 A | * | 4/1917 | Henderson | G01M 3/005 138/90 |
| 3,618,639 A | | 11/1971 | Daley | |
| 3,834,421 A | | 9/1974 | Daley | |
| 3,930,556 A | * | 1/1976 | Kusuda et al. | 73/40.5 A |
| 7,717,137 B2 | * | 5/2010 | Bednarzik | 138/93 |
| 2011/0000567 A1 | * | 1/2011 | Iwasaki-Higbee | 138/98 |

FOREIGN PATENT DOCUMENTS

| | | | |
|---|---|---|---|
| DE | 4336435 | | 4/1995 |
| JP | 6-174181 | * | 6/1994 |
| WO | 0047928 | | 8/2000 |

OTHER PUBLICATIONS

European Search Report for European Patent Application EP12405050.1 dated 16.11.12, 3 pages.

* cited by examiner

*Primary Examiner* — J. Casimer Jacyna
(74) *Attorney, Agent, or Firm* — Edward B. Weller

(57) ABSTRACT

A first sealing body and a second sealing body made of a resiliently expandable material, such as Kevlar-reinforced rubber, are connected by an intermediate piece that, having a larger wall thickness, is made of the same material, and is flexible, thereby providing the device excellent ability to pass through pipe bends. Together they surround a contiguous cavity into which pressurised air can be introduced via a pressurised air connection disposed on an end plate at a rear end of the device, to expand the diameters of the sealing bodies whereupon the latter tightly close off a test space in a pipe connection. A material feeding connection is connected to a discharge opening in a threaded bushing connecting the intermediate piece to the second sealing body, and a cable connection is connected to a camera facing to the outside that is attached to the bushing.

18 Claims, 2 Drawing Sheets

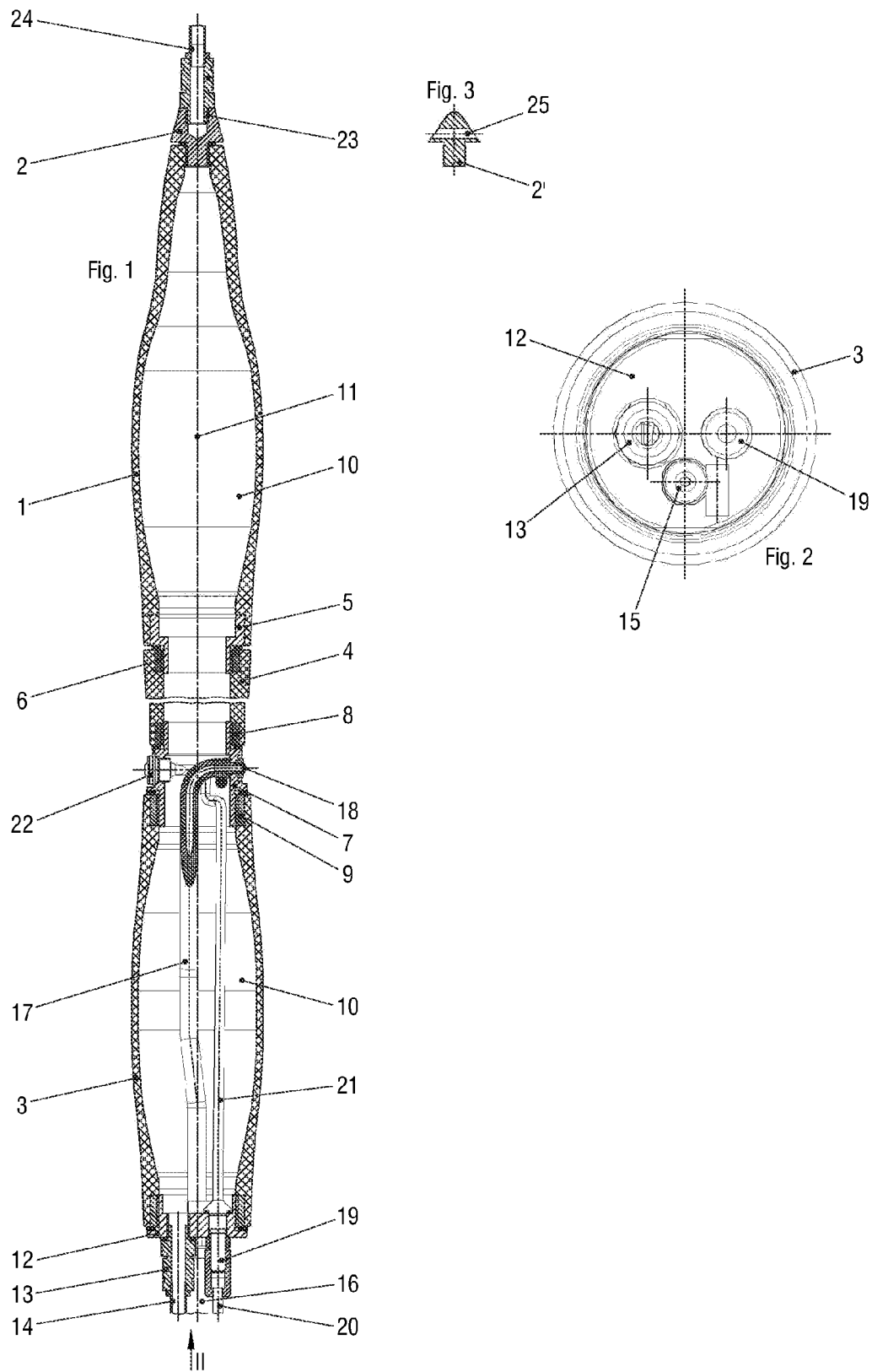

DEVICES AND METHODS FOR THE CHECKING AND FOR THE CHECKING AND REPAIRING OF PIPE CONNECTIONS

RELATED APPLICATION

This application claims the benefit of priority under 35 USC §119 to European Patent Application Serial No. EP 12405050.1 filed on May 29, 2012, the entire contents of which are incorporated herein by reference.

FIELD OF THE INVENTION

The invention concerns devices for the checking and repairing of pipe connections as well as methods for the checking and for the checking and repairing of pipe connections. Devices of the mentioned type are primarily used for the detection of leakage points of pipes in sewage systems, and in particular leakages of pipe sockets at pipe joints between adjacent pipes, as well as for the repair of pipe connections at detected leakage points.

PRIOR ART

From U.S. Pat. No. 3,618,639 A a generic device is known, wherein the sealing bodies are configured as rubber tubes respectively surrounding, in their basic state, a metal tube at a short distance. They are connected by means of an intermediate piece configured as a ring also made of metal. The tubes and the ring enclose a cavity through which a pressure line and two material feeding lines are passed. The pressure line is connected to the spaces between the metal tubes and the sealing bodies surrounding them via openings in the tubes. The material feeding lines open into discharge openings in the intermediate piece, so that after the inflation of the sealing bodies, which separates a repair area, sealing material can be introduced into this repair area.

Due to the metal tubes and the ring, the device is completely rigid and thus cannot pass through bends. Therefore, it is virtually impossible to use it in pipe connections with bends.

Similar devices, wherein an intermediate region between the sealing bodies also presses against the interior wall of the pipe, so that the introduced sealing material is pressed against said interior wall, are known as packers.

A flexible device of this type, wherein the intermediate area is also inflatable, is described in U.S. Pat. No. 6,276,398 B1. Although it is able to pass through bends, it is rather complex and harder to operate.

Similar devices with a simpler structure, but rigid and also not able to pass through bends, are known from EP 0 533 999 B1 and DE 39 13 317 A1.

The device described in U.S. Pat. No. 3,834,422, wherein the sealing body and the intermediate piece are additionally surrounded by a cylindrical sleeve made of elastic material, is substantially structured like the generic device mentioned above. This device, however, is also rigid and thus not able to pass through bends.

SUMMARY OF THE INVENTION

It is the object of the invention to provide a generic device that is able to pass through bends so that it can easily be used even in pipe connections with bends.

The device according to the invention is suitable for use in pipe connections with bends of up to 90°, and, with appropriate dimensioning, also in cases where the pipes are rather narrow, for example with internal diameters between 100 mm and 150 mm. At the same time, the device according to the invention has a simple structure and is also easy to operate.

The invention also includes a method for checking a pipe connection for leakage points and a method for checking and repairing a pipe connection.

BRIEF DESCRIPTION OF THE DRAWINGS

In the following, the invention will be explained in more detail with reference to the figures of the drawings, which show only an exemplary embodiment.

FIG. 1 shows a longitudinal section through a device according to the invention, FIG. 2 shows a view of the device according to the invention from FIG. 1 in the direction of the arrow marked with II, FIG. 3 shows a longitudinal section through an exchangeable tip according to a different configuration.

DESCRIPTION OF THE PREFERRED EMBODIMENTS

Figure 4:
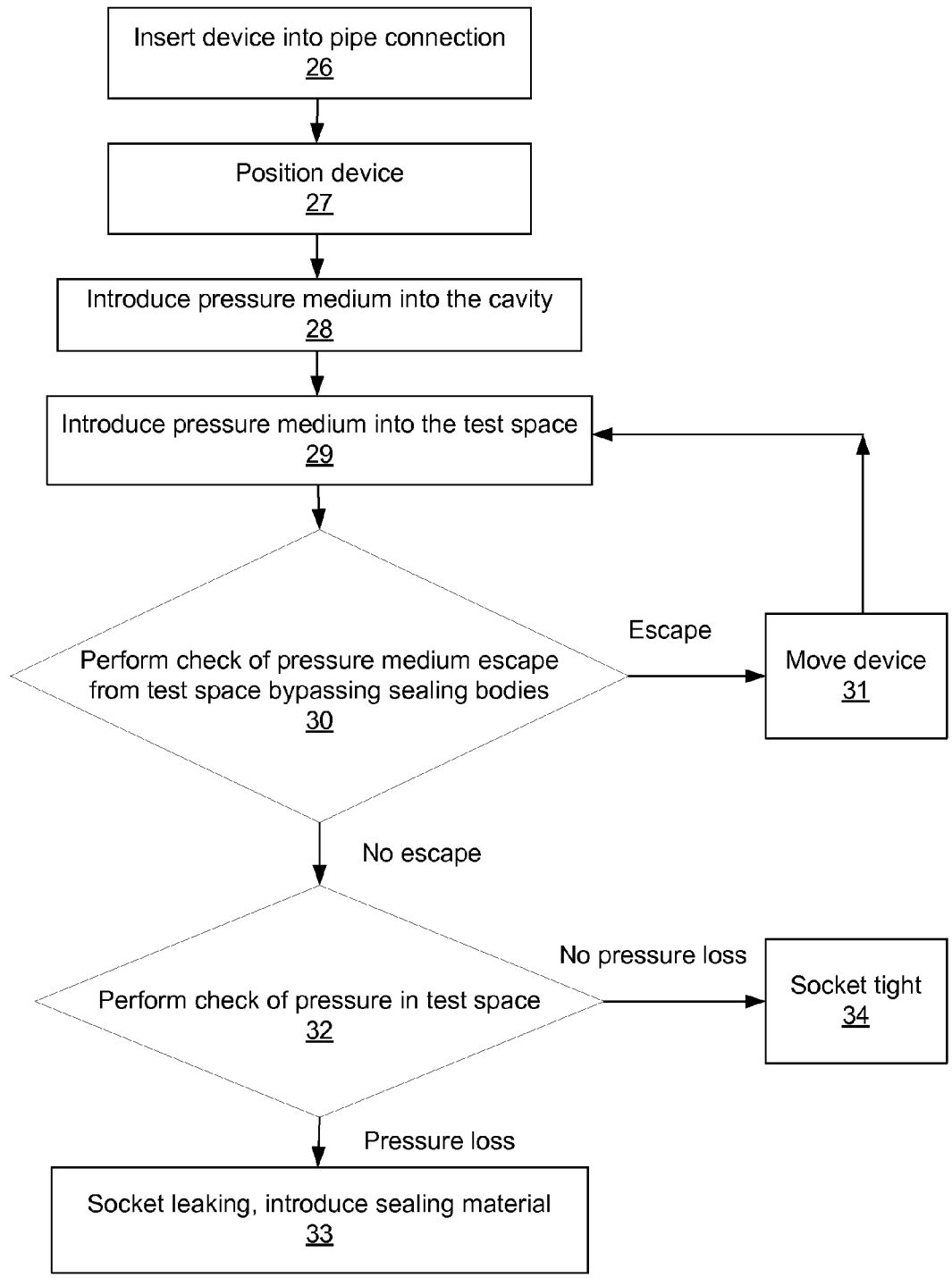
FIG. 4 shows a flowchart of checking a pipe connection for a leakage point.

As can be seen from FIG. 1, the device according to the invention has a first resiliently flexible sealing body 1. The first sealing body 1 is a hollow body made from a resiliently expandable laminar, i.e., relatively thin, material, with a substantially cylindrical but slightly convex section, to which a substantially conical section tapering towards a front end is adjacent that ends in an opening with an inner thread into which an exchangeable tip 2 is screwed.

Longitudinally spaced apart thereto, an otherwise similar, in particular also resiliently flexible second sealing body 3 is arranged, which has a substantially cylindrical shape and is slightly convex. The second sealing body 3 is made of the same material as the first sealing body 1. The first sealing body 1 and the second sealing body 3 are interconnected by an intermediate piece 4, which can be in about as long as the first sealing body 1, but also longer or shorter than the latter, depending on the dimension and the intended area of use.

The intermediate piece 4 is configured as a tube whose diameter is somewhat smaller than the diameters of the sealing bodies 1, 3 and which is also made of a resiliently expandable material so as to be flexible to such an extent that the second sealing body 3 can be bent relative to the first sealing body 1 by at least 30°, preferably by at least 90°, such that the device can be pulled or pushed even through 90° bends of a narrow pipe. However, the wall of the intermediate piece 4 is only expandable to a small extent and dimensionally stable otherwise. The intermediate piece 4 may consist of the same material as the sealing bodies 1, 3, while its relatively limited expandability can be achieved by a larger wall thickness that can amount to about 2 to 3 times the minimal wall thickness of the sealing bodies 1, 3. The ability to pass through pipe bends is enhanced by the flexibility of the sealing bodies 1, 3, as well as by the fact that the front part of the first sealing body 1 is tapering towards the front end.

The intermediate piece 4 is connected to the first sealing body 1 by a coupling ring configured as a first threaded bushing 5 vulcanised onto the first sealing body 1 and screwed into a first threaded ring 6 vulcanised onto the intermediate piece 4. An additional coupling ring is configured as a slightly longer second threaded bushing 7 screwed into a second threaded ring 8 also vulcanised onto the intermediate piece 4 and into a third threaded ring 9 vulcanised onto the second sealing body 3, thereby forming the connection between the intermediate piece 4 and the second sealing body 3.

Together with the two threaded bushings 5, 7, the two sealing bodies 1, 3 and the intermediate piece 4 enclose a contiguous cavity 10 and are essentially rotationally symmetrical about a longitudinal axis 11. At a rear end of the device, the second sealing body 3 is closed off by an end plate 12 (see also FIG. 2). The end plate 12 has a coupling piece serving as a pressurised air connection 13 to which a pressurised air line 14 can be connected and that opens immediately into the cavity 10. The end plate 12 further has a material feeding connection 15 for connecting to a material feeding line 16, to which a connection line 17 is attached on the inner side, i.e., a hose that leads through the part of the cavity 10 surrounded by the second sealing body 3 to a discharge opening 18 in the second threaded bushing 7.

Via the pressurised air connection 13, pressurised air can be introduced as a pressure medium, while via the material feeding connection 15 air as a pressure medium can equally be fed, or water or sealing material. In addition, the end plate 12 has a cable connection 19 to which a camera cable 20 can be attached and which in turn is connected, by a connection cable 21 passing through the part of the cavity 10 surrounded by the second sealing body 3, with a camera 22 inserted into a radial threaded hole in the second threaded bushing 7 and facing to the outside.

In use, it is possible to connect a push rod 24 to the tip 2 at the front end that has a threaded hole 23 for that purpose. Alternatively, it is possible to use the tip 2' shown in FIG. 3 that is provided with a transverse hole 25 for the insertion of a cord. On the rear end, the pressurised air line 14, which is configured accordingly, serves as the push rod.

The dimensions of the device of course depend on the area of use, in particular the internal diameter of the pipes that are to be inspected and sealed. For pipes with an internal diameter of between 100 mm and 150 mm, the diameter of the sealing bodies 1, 3 can be between 80 mm and about 100 mm, and their length between 250 mm and 350 mm. The length of the intermediate piece 4 can lie between 100 mm and 400 mm, preferably between 150 mm and 250 mm. By introducing air into the cavity 10 via the pressurised air connection 13, the diameter mainly in the central area of the cylindrical section of the first sealing body 1 and in the central area of the second sealing body 3, where the wall thickness is relatively small, can be significantly expanded compared to the basic state shown in FIG. 1, the expansion limit preferably lying between 50% and 100%. The diameter of the intermediate section 4 increases only marginally due to the relatively large wall thickness.

As the material for the first sealing body 1, the second sealing body 3 and the intermediate piece 4, rubber, which may be reinforced with Kevlar, is most suitable. The threaded bushings 5, 7 and the threaded rings 6, 8 and 9 consist of metal, in particular, of brass or stainless steel.

As can be seen from FIG. 4, if a leakage at a pipe connection of a sewage system is suspected, usually at a pipe socket, the device according to the invention can be inserted at 26 into the system. For that purpose, the pressurised air line 14, the material feeding line 16 and the camera cable 20 are connected at the rear end, and the push rod 24 or a cord are fixed to the front end. The cavity 10 is connected to an air-compressor unit via the pressurised air line 14, the discharge opening 18 is connected to the air-compressor unit or a glue pump, which can be selectively connected to the material feeding line 16, via the connection line 17 and the material feeding line 16, and the camera 22 is connected to a display via the connection cable 21 and the camera cable 20.

At 27, the device is then pushed or pulled through the pipe connection until the pipe socket which is suspected to leak is detected by the camera 22. Due to the flexibility of the intermediate piece 4, even heavily bent pipe sections, for example with an angle of 90°, can be passed, and if necessary the device can even be pulled through branching points.

Subsequently, the tightness of the pipe socket is checked. For that purpose, at 28, pressurised air is fed into the cavity 10 via the pressurised air line 14 and the sealing bodies 1, 3 are inflated until the sealing bodies 1, 3 tightly abut against the interior wall of the sewage pipe and close off a test space between them from the remaining space enclosed by the pipe connection. Then again, at 29, air as the pressure medium is pressed into the test space via the material feeding line 16, the connection line 17 and the discharge opening 18 in order to build up an overpressure, of e.g., 200 mbar, therein. Subsequently, a check is performed at 30 as to whether the test space is tightly closed off by the sealing bodies 1, 3 or whether, e.g., due to contaminations on one of the sealing bodies 1, 3, air can escape between the latter and the interior wall of the pipe. This can for example be achieved by microphones attached to the push rods 14, 24 that detect any noises possibly caused by the escaping of air between one of the sealing bodies 1, 3 and the interior wall of the pipe surrounding it. In this case the device can, at 31, be shifted by a small distance along the pipe, preferably with previous reduction of the pressure in the cavity 10 and the check, with the overpressure in the cavity 10 re-established, and repeated.

If no such noises have been detected and hence the sealing has been found tight, but still a pressure drop is, at 32, found to have occurred in the test space, it is inferred at 33 that the pipe socket is leaking and that the pipe section surrounding it has to be repaired or sealed. For that purpose a sealing material is introduced, also via the material feeding line 16, which is connected to the glue pump for that purpose, the sealing material consisting of a sealing agent containing polyurethane and a curing agent, the sealing material escaping through the leakage point or points and reacting with ambient humidity in a way that it expands, tightly bonds to any sand, gravel or concrete in the periphery of the pipe and is pressed against the exterior of the pipe, to which it may also bond. In any case it forms a mixture with the ambient material surrounding the pipe.

Subsequently, the pressurised air is discharged from the sealing bodies 1, 3 so that the sealing bodies 1, 3 return to their basic states, and the device is pulled out of the sewage pipe by the push rod 24 or the cord. The pipe is then rinsed with a rinsing medium, preferably water, and any excess sealing material that has accumulated on the interior pipe wall is removed.

After the curing of the sealing agent, the said mixture and the sealing agent filling the leakage point tightly seal the pipe connection. The curing time of the sealing agent can be adjusted by appropriately selecting the relative proportion of curing agent mixed therewith. In addition, it depends on the temperature in the pipe and its vicinity and may be between about one minute and several minutes. It is possible to use MG-SLV as the sealing agent and MG-Accelerator as the curing agent. It is also recommendable to spray the device and the lines and cables with MG-Pumpflush before use; this substantially facilitates the removal of any sealing agent that may have accumulated on the device after its use. Said items are available from IJP-Zuerisee, Staldenbachstrasse 5, CH-8808 Pfäffikon SZ, Switzerland.

If on the other hand, no pressure drop is found to have occurred in the test space it is, at 34, inferred that the socket is tight.

LIST OF REFERENCE SYMBOLS

1 First sealing body
2, 2' Tip
3 Second sealing body
4 Intermediate piece
5 First threaded bushing
6 First threaded ring
7 Second threaded bushing
8 Second threaded ring
9 Third threaded ring
10 Cavity
11 Longitudinal axis
12 End plate
13 Pressurised air connection
14 Pressurised air line
15 Material feeding connection
16 Material feeding line
17 Connection line
18 Discharge opening
19 Cable connection
20 Camera cable
21 Connection cable
22 Camera
23 Threaded hole
24 Push rod
25 Transverse hole

The invention claimed is:

1. A device for the checking and repairing of pipe connections, the device comprising:
a first sealing body, and a second sealing body spaced apart therefrom in a longitudinal direction, each consisting of an elastically expandable laminar material so as to be inflatable from a basic state by introduction of a pressure medium in such a way that its diameter is larger than in the basic state,
an intermediate piece configured as a flexible but otherwise dimensionally stable tube that connects the first sealing body and the second sealing body to allow the first sealing body to be bent relative to the second sealing body away from the longitudinal direction, the first sealing body, the second sealing body and the intermediate piece surrounding a common cavity,
an end plate closing off the second sealing body on a rear end of the second sealing body,
a pressurised air connection for connecting a pressurised air line with the common cavity, and
a material feeding connection connected via a connection line to a discharge opening in the area of the intermediate piece for the connection of a material feeding line, the pressurised air connection and the material feeding connection are arranged at said end plate.

2. A device for the checking and repairing of pipe connections, with a first sealing body, and a second sealing body spaced apart therefrom in a longitudinal direction, each consisting of an elastically expandable laminar material so as to be inflatable from a basic state by introduction of a pressure medium in such a way that its diameter is larger than in the basic state, and with an intermediate piece configured as a flexible but otherwise dimensionally stable tube that connects the first sealing body and the second sealing body, the first sealing body, the second sealing body and the intermediate piece surrounding a common cavity, and with an end plate closing off the second sealing body on a rear end, at said plate a pressurised air connection for connecting a pressurised air line with the common cavity and a material feeding connection connected via a connection line to a discharge opening in the area of the intermediate piece for the connection of a material feeding line are arranged,
wherein the flexibility of the intermediate piece is within such a range that the second sealing body can be bent relative to the first sealing body by at least 30°.

3. The device of claim 1, wherein the first sealing body and the second sealing body in their basic state each have a larger diameter than the intermediate piece.

4. The device of claim 1, wherein the first sealing body is tapering towards a front end.

5. The device of claim 1, wherein the first sealing body, the second sealing body and the intermediate piece are rotationally symmetrical about a common longitudinal axis.

6. The device of claim 1, wherein the first sealing body, the second sealing body and the intermediate piece are made of the same material, the wall thickness of the intermediate piece being larger than the wall thicknesses of the sealing bodies.

7. The device of claim 6, wherein the wall thickness of the intermediate piece is between 3 and 5 times the minimal wall thickness of the sealing bodies.

8. A device for the checking and repairing of pipe connections, with a first sealing body, and a second sealing body spaced apart therefrom in a longitudinal direction, each consisting of an elastically expandable laminar material so as to be inflatable from a basic state by introduction of a pressure medium in such a way that its diameter is larger than in the basic state, and with an intermediate piece configured as a flexible but otherwise dimensionally stable tube that connects the first sealing body and the second sealing body, the first sealing body, the second sealing body and the intermediate piece surrounding a common cavity, and with an end plate closing off the second sealing body on a rear end, at said plate a pressurised air connection for connecting a pressurised air line with the common cavity and a material feeding connection connected via a connection line to a discharge opening in the area of the intermediate piece for the connection of a material feeding line are arranged,
wherein the intermediate piece is connected to the first sealing body by a rigid first threaded bushing, and to the second sealing body through a rigid second threaded bushing.

9. The device of claim 8, wherein the discharge opening is disposed in a wall of the second threaded bushing.

10. The device of claim 8, wherein a camera facing to the outside is arranged on the first threaded bushing or the second threaded bushing, the camera being connected with a cable connection on the end plate by a connection cable.

11. The device of claim 1, wherein the first sealing body carries an exchangeable tip at a front end that is detachably attached to the first sealing body and configured to couple to an urging member to move the device in a pipe.

12. The device of claim 1, wherein each of the sealing bodies is inflatable, by introduction of a pressure medium, to an extent that its diameter is increased by between 50% and 100%.

13. The device of claim 1, wherein the diameters of the first sealing body and the second sealing body are between 80 mm and 100 mm.

14. The device of claim 1, wherein the length of the intermediate piece is between 100 mm and 400 mm.

15. A method for checking a pipe connection for a leakage point, the method comprising:
inserting into the pipe connection a device with a first sealing body, and a second sealing body spaced apart therefrom in a longitudinal direction, each consisting of an elastically expandable laminar material so as to be inflatable from a basic state by introduction of a pressure medium in such a way that its diameter is larger than in the basic state, and with an intermediate piece configured as a flexible but otherwise dimensionally stable tube that connects the first sealing body and the second sealing body, the first sealing body, the second sealing body and the intermediate piece surrounding a common cavity, and with an end plate closing off the second sealing body on a rear end, at said plate a pressurised air connection for connecting a pressurised air line with the common cavity and a material feeding connection connected via a connection line to a discharge opening in the area of the intermediate piece for the connection of a material feeding line are arranged,
positioning the device in a way that the intermediate piece is situated in the area of a possible leakage point,
subsequently introducing a pressure medium into the cavity via a pressurised air line connected to the pressurised air connection, and inflating the first sealing body and the second sealing body to the extent that the first sealing body and the second sealing body in each case tightly close off the pipe and separate a test space,
then introducing a pressure medium into the test space, via the material feeding line connected to the material feeding connection and through the discharge opening,
performing a check as to whether pressure medium escapes from the test space,
and if so, detecting the presence of a leakage point in a repair section of the pipe joint surrounding the test space.

16. The method of claim 15, wherein, after the inflation of the first sealing body and the second sealing body and before the detection whether a leakage point is present, in each case a check is performed, by introducing pressure medium into the test space and detecting any possible noises occurring at the sealing bodies, whether the sealing bodies tightly seal the pipe.

17. A method for checking a pipe connection for a leakage point and and repairing the pipe connection, the method comprising:
inserting into the pipe connection a device with a first sealing body, and a second sealing body spaced apart therefrom in a longitudinal direction, each consisting of an elastically expandable laminar material so as to be inflatable from a basic state by introduction of a pressure medium in such a way that its diameter is larger than in the basic state, and with an intermediate piece configured as a flexible but otherwise dimensionally stable tube that connects the first sealing body and the second sealing body, the first sealing body, the second sealing body and the intermediate piece surrounding a common cavity, and with an end plate closing off the second sealing body on a rear end, at said plate a pressurised air connection for connecting a pressurised air line with the common cavity and a material feeding connection connected via a connection line to a discharge opening in the area of the intermediate piece for the connection of a material feeding line are arranged,
positioning the device in a way that the intermediate piece is situated in the area of a possible leakage point,
subsequently introducing a pressure medium into the cavity via a pressurised air line connected to the pressurised air connection, and inflating the first sealing body and the second sealing body to the extent that the first sealing body and the second sealing body in each case tightly close off the pipe and separate a test space,
then introducing a pressure medium into the test space, via the material feeding line connected to the material feeding connection and through the discharge opening,
performing a check as to whether pressure medium escapes from the test space,
and if so, detecting the presence of a leakage point in a repair section of the pipe joint surrounding the test space, and
after detection of the presence of a leakage point, introducing a curable sealing agent through the discharge opening into the test space via the material feeding line connected to the material feeding connection,
and subsequently returning the sealing bodies to their basic states, removing the device from the leakage point and rinsing the pipe with a rinsing medium.

18. The method of claim 17, wherein the sealing agent is a mixture containing polyurethane and a curing agent.

* * * * *